Nov. 11, 1941.  R. M. EVANS  2,262,394
INSULATION JACKET FOR LINEMEN'S CLIMBERS
Filed Nov. 8, 1940
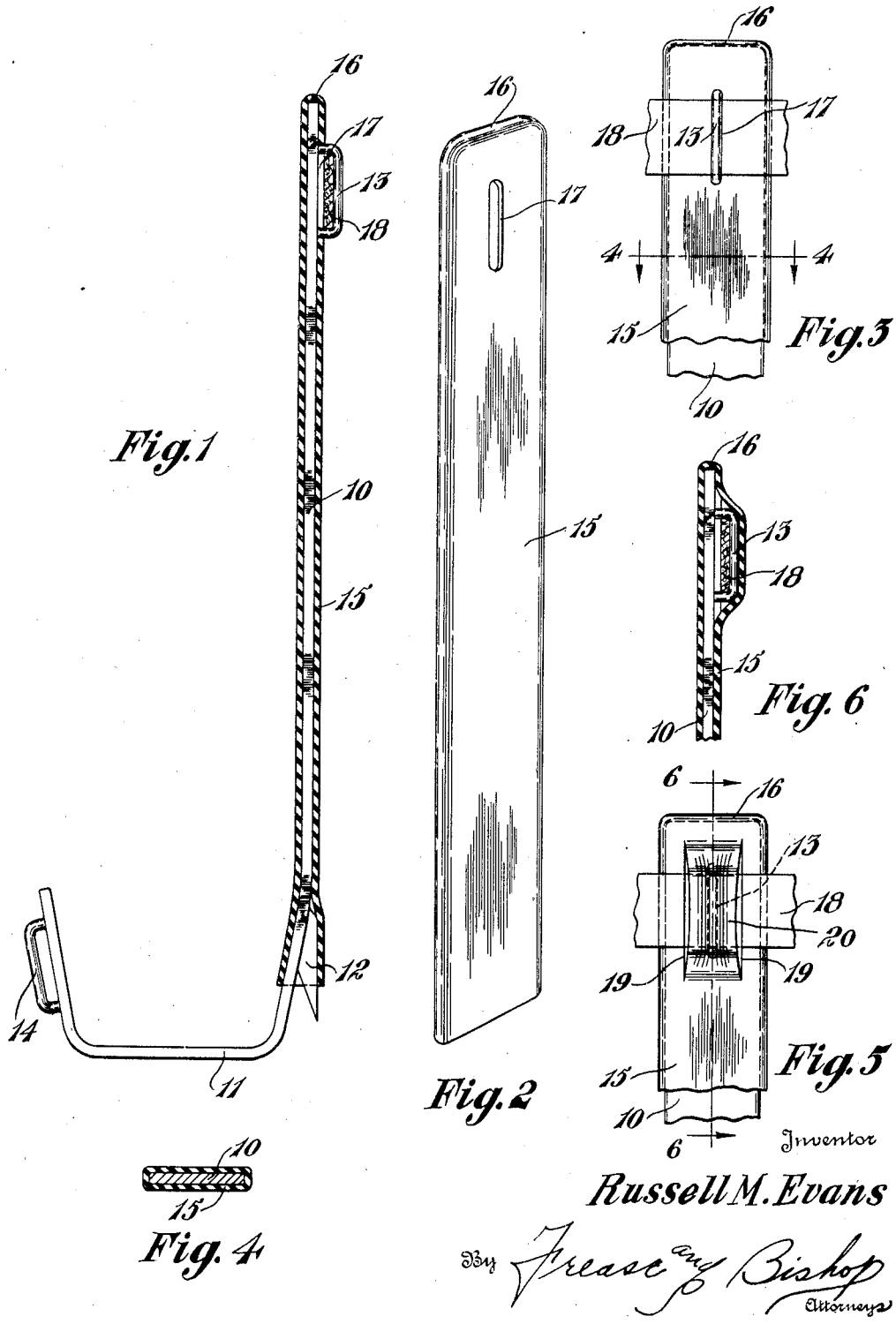
Inventor
Russell M. Evans
By Frease and Bishop
Attorneys Patented Nov. 11, 1941

2,262,394

UNITED STATES PATENT OFFICE 2,262,394

INSULATION JACKET FOR LINEMEN'S CLIMBERS

Russell M. Evans, Carrollton, Ohio, assignor to The Surety Rubber Company, Carrollton, Ohio, a corporation of Ohio Application November 8, 1940, Serial No. 364,854

3 Claims. (Cl. 227—27)

The invention relates to climbers for electric linemen, and more particularly to a safety jacket formed of rubber or other pliable insulation material adapted to be quickly and easily placed upon or removed from a climber of usual and well-known design, so as to be practically completely insulated in order to protect the lineman while he is working upon a pole.

Linemen are in constant danger when repairing or placing lines upon poles, as the sides of their climbers frequently come into contact with live wires or poorly insulated guy wires, often resulting in instant electrocution.

For this reason some of the large power companies have sought safety means to insulate the lineman's climbers so as to overcome this hazard.

The invention therefore, has for its object the provision of an insulation jacket for linemen's climbers constructed so as to properly insulate the climbers in order to avoid stray currents which may result in the death of the lineman.

Another object is to provide an insulation jacket which may be easily and readily attached to or removed from a lineman's climber.

A further object of the invention is to provide an insulation jacket which may be conveniently made up in one piece of suitable rubber capable of detachable connection with the shank and spur portion of a climber.

A still further object is to provide an insulation jacket in the form of a flat tube of pliable rubber, or similar material, open at its lower end and adapted to be telescoped over the shank and spur portion of a climber.

Yet another object of the invention is the provision of an insulation jacket of this character having a closed upper end adapted to receive the upper end of the shank portion of the climber.

The improvement further contemplates the provision of such an insulation jacket having its upper portion slotted to accommodate the usual loop at the upper end of the climber shank, through which the ordinary leg strap is passed.

The above objects, together with others which will be apparent from the drawing and following description, or which may be later referred to, may be attained by constructing the improved safety jacket in the manner illustrated in the accompanying drawing, in which Figure 1 is an elevation of a lineman's climber of conventional form, showing the improved safety jacket in section thereon;

Fig. 2, a detached, perspective view of the improved jacket;

Fig. 3, a fragmentary elevation of the upper portion of a climber shank with the insulation jacket applied thereto, illustrating the manner in which the upper portion of the jacket may be slotted to accommodate the leg strap loop;

Fig. 4, a transverse section through the climber shank and jacket, taken as on the line 4—4, Fig. 3;

Fig. 5, a view similar to Fig. 3 showing a modified form of slot for the leg strap and loop; and Fig. 6, a section taken as on the line 6—6, Fig. 5.

Similar numerals refer to similar parts throughout the several views.

The embodiment of the invention illustrated in the accompanying drawing is designed to be applied to a lineman's climber of usual and well-known form comprising the shank portion 10 having the usual stirrup 11 at its lower end, and provided with the conventional spur 12 adjacent to said stirrup; loops 13 and 14, respectively, being located at the upper end of the shank and at the outer side of the stirrup for connection of the usual leg strap and foot strap, respectively.

The insulation jacket to which the invention pertains is formed as a single unit, preferably of pure rubber or such flexible rubber as is known to have the desired insulating qualities although any suitable flexible insulating material may be used, the principal requirement being that the jacket protect the legs of the lineman from making electrical contact with the pole as well as with the climber regardless of the kind of insulation material used.

The improved safety jacket is illustrated generally at 15 and is of tubular shape preferably flat in cross-section to conform to the shape of the shank 10 of the climber and is of such length as to extend from the upper end of the climber to a point near the lower end of the spur 12, as best shown in Figure 1.

The upper end of the jacket 15 is preferably closed as indicated at 16 so as to entirely enclose the shank portion of the climber and insulate the same from the leg of the wearer.

The lower open end of the insulation jacket extends over the greater portion of the spur 12 and the adjacent portion of the stirrup 11 of the climber and the rubber is sufficiently resilient to permit the jacket to be stretched thereover as shown in Figure 1.

In order to accommodate the loop 13 provided at the upper end of the shank portion of the climber to receive the usual leg strap, a slot 17 may be formed in the upper portion of the insulation jacket to permit the loop 13 to extend therethrough so that the leg strap 18 may be passed through the loop on the outer side of the jacket as shown in Figs. 1 and 3.

If it is desired to entirely insulate the loop 13, the same may be accommodated by forming two parallel cuts 19 in the outer side of the jacket spaced equally from the longitudinal center thereof as shown in Figs. 5 and 6 so that the loop 13 may be covered by the central web 20 thus formed, permitting the leg strap 18 to be passed through the loop between the jacket and the web 20 as shown in Fig. 5 and Fig. 6.

In actual use each lineman is provided with a pair of these insulation safety jackets as illustrated and above described and with a pair of heavy rubber overshoes whereby his feet and legs are entirely insulated from the climbers making it safe for him to work upon poles carrying high tension wires without danger of either his feet or legs coming into contact with the wires.

I claim:

1. In combination with a lineman's climber having a shank portion with a leg strap loop near its upper end and having a stirrup at its lower end with a spur upon the outside of said stirrup, an insulation jacket of tubular form detachably, slidably mounted upon said shank portion and extending from the upper end thereof to a point near the end of said spur, the upper portion of the jacket being slotted to accommodate said loop.

2. In combination with a lineman's climber having a shank portion with a leg strap loop near its upper end and having a stirrup at its lower end with a spur upon the outside of said stirrup, an insulation jacket of tubular form detachably, slidably mounted upon said shank portion and extending from the upper end thereof to a point near the end of said spur, the upper portion of the jacket having two spaced, parallel cuts therein providing a web therebetween to accommodate said loop.

3. In combination with a lineman's climber having a flat shank portion with a leg strap loop near its upper end and having a stirrup at its lower end with a spur upon the outside of said stirrup, an insulation jacket of flat, tubular form shaped to fit said shank portion and closed at its upper end, said insulation jacket being detachably, slidably mounted upon said shank portion and extending from the upper end thereof to a point near the end of the spur, the upper portion of the jacket being cut to accommodate said loop so that a leg strap may be passed through the loop and across the outer surface of the insulation jacket.

RUSSELL M. EVANS.